United States Patent
Chen

(10) Patent No.: US 7,532,910 B2
(45) Date of Patent: May 12, 2009

(54) MULTIFUNCTIONAL MOBILE PHONE WITH AUTOMATIC CANNOT ANSWER MESSAGING

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 635 days.

(21) Appl. No.: 11/118,502

(22) Filed: Apr. 29, 2005

(65) Prior Publication Data

US 2006/0046776 A1    Mar. 2, 2006

(30) Foreign Application Priority Data

Aug. 26, 2004    (CN) .................. 2004 1 0051281

(51) Int. Cl.
*H04M 1/00* (2006.01)
(52) U.S. Cl. ............... 455/556.1; 455/550.1; 455/90.2; 455/552.1
(58) Field of Classification Search ............. 455/556.1, 455/557, 552.1, 90.2, 550.1, 90.3, 566, 556.2, 455/418, 414.1; 348/552, 335
See application file for complete search history.

(56) References Cited

U.S. PATENT DOCUMENTS 7,271,845 B2 * 9/2007 Aoyama et al. ............. 348/552
2004/0246342 A1 * 12/2004 Kim et al. ............... 348/207.99
2005/0014527 A1 * 1/2005 Chambers et al. ......... 455/556.1

FOREIGN PATENT DOCUMENTS

| CN | 86200331 U | 12/1986 |
|---|---|---|
| CN | 02116959.4 | 11/2003 |
| JP | 2003-143261 A | 5/2003 |

* cited by examiner

*Primary Examiner*—John J Lee

(57) ABSTRACT

A multifunctional mobile phone includes a control system, a keypad (3) with a switch (31) comprising a "self-take pictures" position, a camera module (4) with an image sensor and a "self-take pictures" state, a timer connected to the camera module, and a housing (2) for receiving the control system, the keypad, the camera module and the timer therein. The switch, the camera module and the timer are connected to and controlled by the control system. When the owner of the multifunctional mobile phone cannot answer an incoming call, the camera module takes a picture automatically and sends it to the caller together with a word message after a prearranged time. Then the caller will hang up the phone. Thus the multifunctional mobile phone will not make endless noise.

11 Claims, 3 Drawing Sheets

MULTIFUNCTIONAL MOBILE PHONE WITH AUTOMATIC CANNOT ANSWER MESSAGING

BACKGROUND OF THE INVENTION

1. Field of the Invention

The present invention relates to mobile phones, and more particularly to a multifunctional mobile phone with messaging when a receiver cannot answer an incoming call.

2. Related Art

Nowadays, mobile phones are popular for all kinds of communication, and have brought much convenience to our lives. However, a common problem is the incessant ringing of a mobile phone when the owner is absent or is occupied (e.g., in a classroom or a meeting room) such that they cannot conveniently answer the phone. Moreover, the caller may worry about why the owner does not respond to the call.

To some extent, a mobile phone as disclosed in China Pat. No. 02116959.4 solves the above problems. Some telephone numbers are input to the mobile phone beforehand. If an incoming call corresponds to one of the preset telephone numbers, the mobile phone can answer the call automatically without ringing, answer the call automatically after the mobile phone has rung for a period of time, vibrate, enable a voice message to be left, and so on. That is, if the caller's telephone number is one of the preset telephone numbers, the caller can control the response of the mobile phone. In particular, the caller can control the mobile phone to not make any noise, and/or to answer the call automatically. Further, the caller can know whether it is convenient for the owner to answer the call, according to ambient sound around the mobile phone being conveyed to the caller. For example, if the mobile phone is in an active classroom or meeting room and the receiver doesn't answer the call, the caller can control the receiver's mobile phone to answer the call, then the caller realize that the owner is occupied with the class or meeting, and then hang up the caller's phone. Thus the owner of the mobile phone and other people around him are not disturbed. Further, the caller can set his heart at rest, knowing that there is no untoward reason why the owner does not answer the call.

However, if the mobile phone is left in a quiet classroom or meeting room, the caller may not hear any ambient sounds from around the mobile phone. This may result in the incessant ringing and worrying problems described above. In addition, the mobile phone performs the above-described services only when the call corresponds to one of the preset telephone numbers. Furthermore, the caller may misjudge the ambient sounds he hears. Moreover, for reasons of freedom and privacy, the owner may not want his mobile phone to be controlled by callers, even those whose telephone numbers are among the preset telephone numbers.

SUMMARY

Accordingly, a multifunctional mobile phone which need not make disruptive noise, which can set an unanswered caller's heart at rest, and which is primarily controlled by its owner rather than a caller is provided.

An exemplary multifunctional mobile phone of the present invention includes a control system, a keypad with a switch which includes a "self-take pictures" position, a camera module with an image sensor and a "self-take pictures" state, a timer connected to the image sensor of the camera module, and a housing for receiving the control system, the keypad, the camera module and the timer therein. The switch, the camera module and the timer are connected to and controlled by the control system. When the multifunctional mobile phone is away from the owner or the owner is discommodious to answer the call, and a call comes in, the camera module turns to the "self-take pictures" state and the switch turns to the "self-take pictures" position after a prearranged time. Then the camera module takes a picture automatically and sends the picture to the caller together with a word message. As the caller receives the image and voice messages, he knows the circumstance of the owner of the mobile phone and will hang up the phone at once.

Other advantages and novel features of the present invention will become more apparent from the following detailed description of preferred embodiments thereof when taken in conjunction with the accompanying drawings, in which:

BRIEF DESCRIPTION OF THE DRAWINGS

FIG. 3 is a flow chart of using the mobile phone of FIG. 1 when a call comes in.

DETAILED DESCRIPTION OF THE INVENTION

Figure 1:
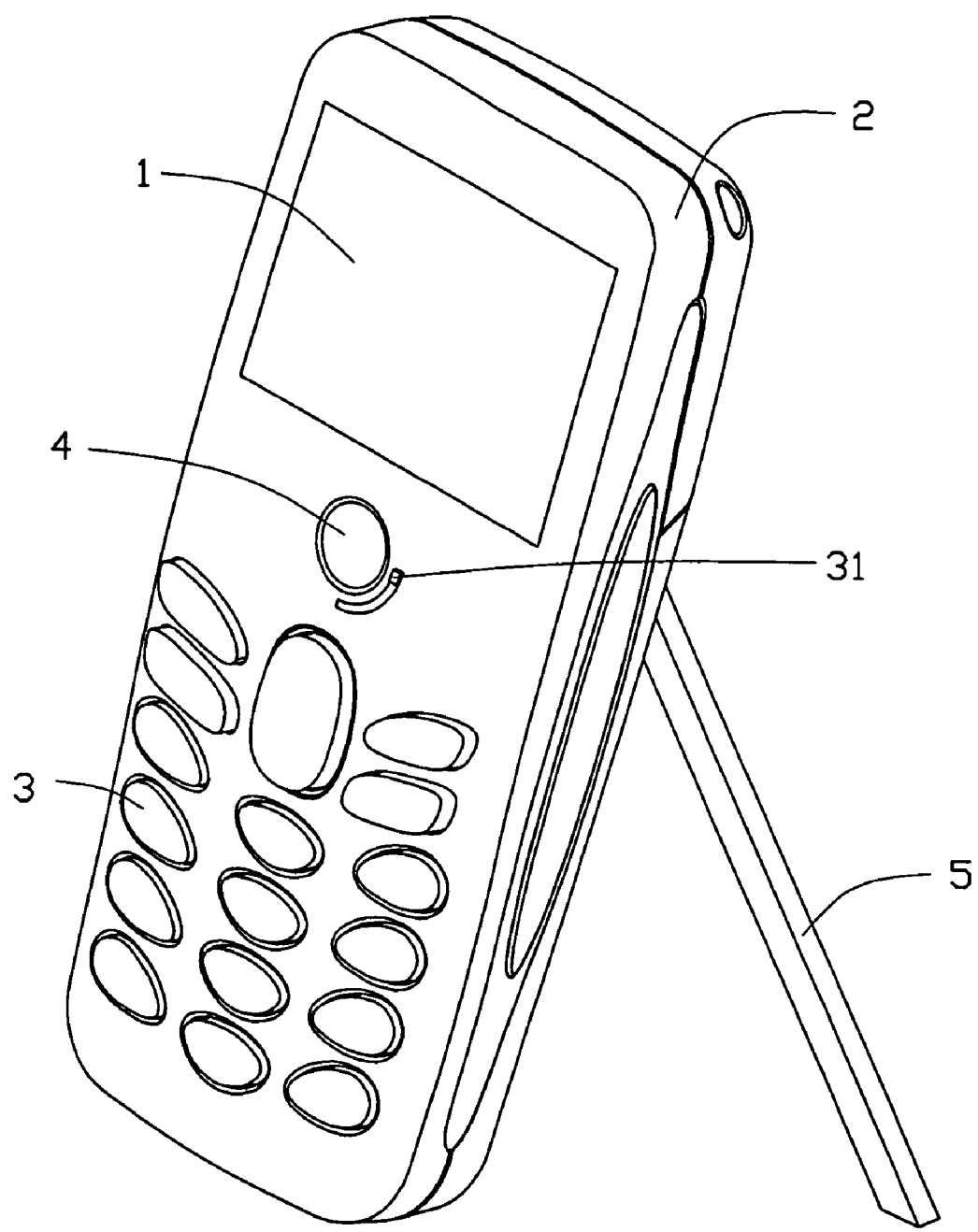
FIG. 1 is an isometric view of a multifunctional mobile phone in accordance with a preferred embodiment of the present invention, showing a stand thereof at an open state.
Figure 2:
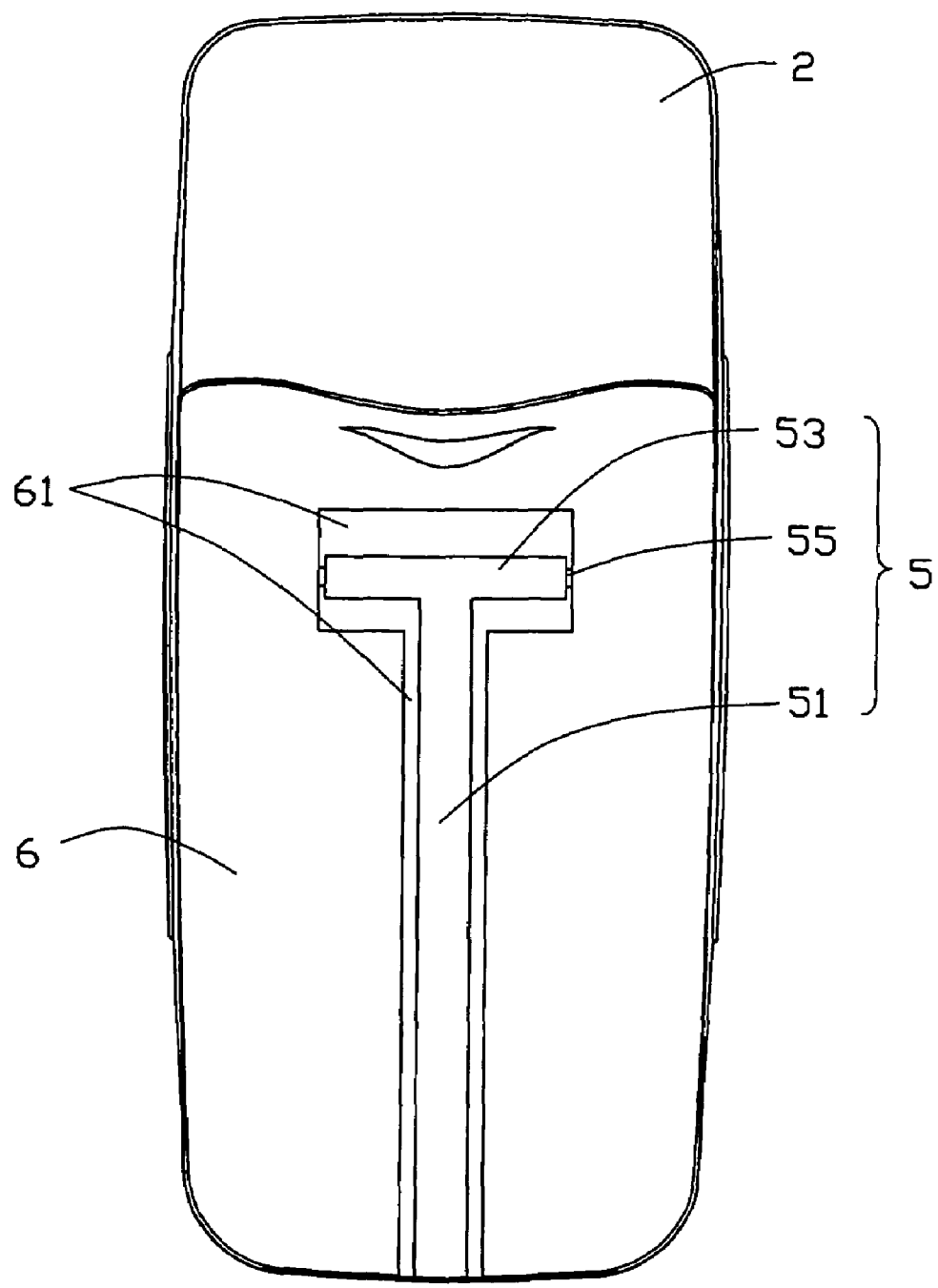
FIG. 2 is a rear plan view of the mobile phone of FIG. 1, but showing the stand at a folded state.

Referring to FIG. 1 and FIG. 2, an exemplary multifunctional mobile phone includes a control system (not shown), a display 1, a housing 2, a keypad 3, a camera module 4, a battery cover 6, a timer (not shown) and a stand 5.

The keypad 3 includes a switch 31. The switch 31 can be switched between three positions, which are on, off, and "self-take pictures." The camera module 4 is thereby controlled to switch between three states, which are on, off, and "self-take pictures". "Self-take pictures" refers to the camera module 4 being able to take a picture without manual manipulation of the mobile phone by a user.

The camera module 4 includes an image sensor (not labeled) such as a CCD (Charge Coupled Device) sensor or a CMOS (Complementary Metal Oxide Semiconductor) sensor. The timer is connected to the image sensor of the camera module 4.

The stand 5 is used to support the mobile phone in a substantially upright position, so that the camera module 4 can properly take needed pictures. The stand 5 includes a staff 51, a crossbeam 53, and two protrusions 55. The staff 51 is perpendicularly connected to the crossbeam 53, so that the stand 5 is T-shaped. The two protrusions 55 are located on two opposite ends of the crossbeam 53 respectively. The stand 5 is rotatably connected to the battery cover 6 of the mobile phone by the two protrusions 55.

The battery cover 6 is assembled to the housing 2 of the mobile phone. A T-shaped slot 61 is defined in a back wall of the battery cover 6. A hole (not visible) is defined in each of opposite sidewalls that bound a top transverse portion of the slot 61. The protrusions 55 are fittingly and rotatably engaged in the holes respectively. Thus the stand 5 can be rotated about the protrusions 55 to a desired angle, such that the stand 5 is set at a folded state or at a desired open state.

The switch 31 of the keypad 3, the camera module 4 and the timer are all connected to and controlled by the control system. The control system makes the mobile phone perform prearranged actions at a prearranged time.

Figure 3:
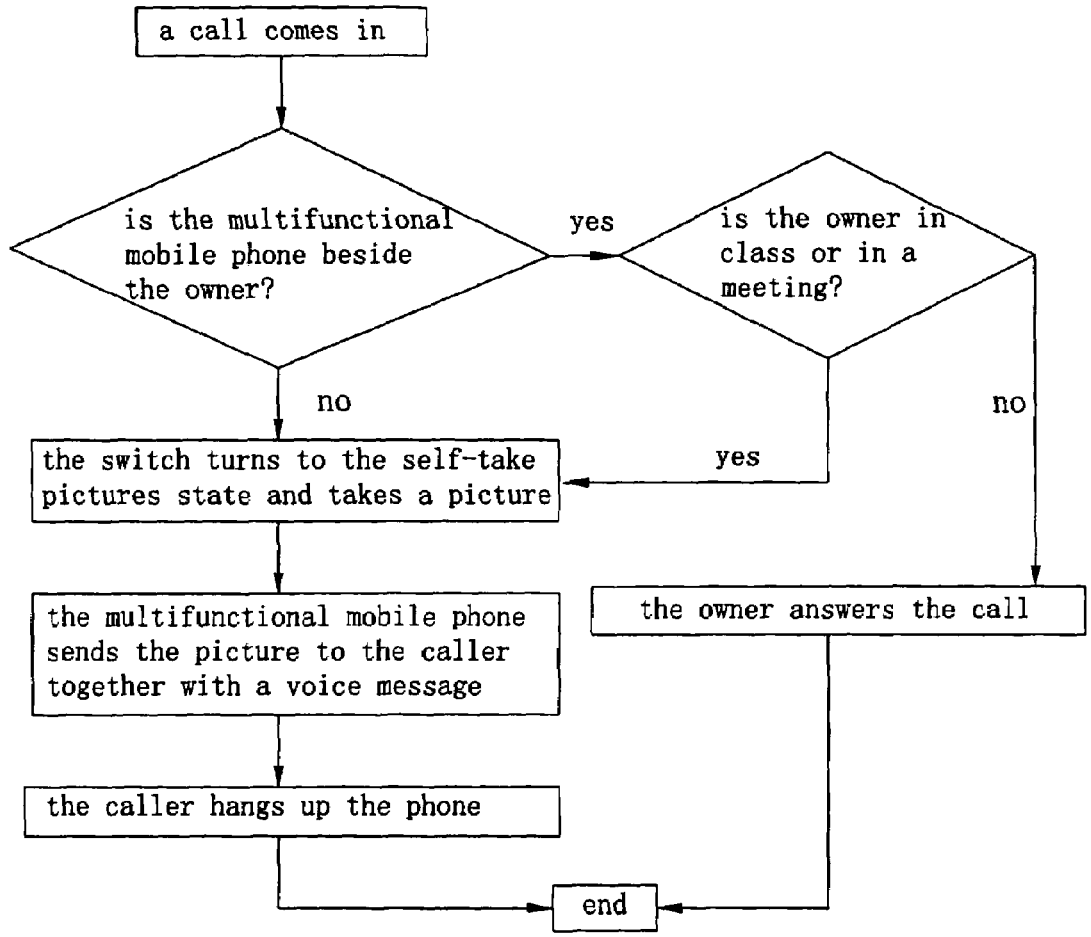

Referring to FIG. 3, in use, if an owner intends to leave his mobile phone behind, he can open the stand 5 beforehand, and put the mobile phone on a table or desk such that the camera module 4 faces a fixed spot like the owner's seat. When a call comes in, the control system makes the timer begin timing as soon as the mobile phone rings so as to wait to identify possible responses of the owner. After a preset time (e.g., several seconds) has elapsed, the switch 31 is switched to the "self-take pictures" position and the camera module 4 is accordingly turned to the "self-take pictures" state by the control system, whereupon the mobile phone takes a picture automatically. Then, the mobile phone sends the picture to the caller together with a voice message to tell the caller that the owner of the mobile phone is away. The caller thus hangs up his phone when he gets the messages. If the owner is beside his mobile phone, for example in class or in a meeting, the mobile phone functions in much the same way as described above. The caller thus realizes the owner of the mobile phone cannot conveniently answer the call, and hangs up his phone. If the owner is beside his mobile phone and it is convenient to answer the call, the owner can answer the call in the usual way.

In alternative embodiments, the slot 61 of the battery cover 6 can be replaced by two opposite protuberances on the battery cover 6, with two holes being defined in the protuberances respectively. Further, the stand 5 can be omitted altogether.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A multifunctional mobile phone, comprising:
    a control system;
    a keypad with a switch which comprises a "self-take pictures" position;
    a camera module with an image sensor and switchable to a "self-take pictures" state by the switch;
    a timer connected to the image sensor of the camera module; and
    a housing for receiving the control system, the keypad, the camera module and the timer therein;
    wherein the switch, the camera module and the timer are connected to and controlled by the control system; and
    when the mobile phone receives an incoming call or message and a user of the mobile phone does not answer the call or message within a predetermined time, the control system switches the switch to the "self-take pictures" position, and the camera module switches to the "self-take pictures" state, takes a picture automatically, and sends the picture to the caller.

2. The multifunctional mobile phone as claimed in claim 1, wherein a word message is also sent to the caller together with the picture.

3. The multifunctional mobile phone as claimed in claim 1, wherein the switch can be switched between three positions, which are on, off, and "self-take pictures".

4. The multifunctional mobile phone as claimed in claim 1, wherein the camera module is switchable between three states, which are on, off, and "self-take pictures".

5. The multifunctional mobile phone as claimed in claim 4, further comprising a stand to support the multifunctional mobile phone.

6. The multifunctional mobile phone as claimed in claim 5, wherein the battery cover defines a slot and a hole at each of opposite sides of the slot.

7. The multifunctional mobile phone as claimed in claim 5, wherein two protuberances are provided on a back of the battery cover, and each of the protuberances defines a hole.

8. The multifunctional mobile phone as claimed in claim 7, wherein the protrusions of the stand rotatably engage in the holes of the battery cover.

9. The multifunctional mobile phone as claimed in claim 1, further comprising a battery cover attached to the housing.

10. The multifunctional mobile phone as claimed in claim 9, wherein the stand comprises a staff, a crossbeam, and two protrusions provided at two ends of the crossbeam.

11. The multifunctional mobile phone as claimed in claim 10, wherein the protrusions of the stand rotatably engage in the holes of the battery cover.

* * * * *